Patented May 8, 1934

1,957,599

UNITED STATES PATENT OFFICE 1,957,599

DYESTUFF OF THE ANTHRAQUINONE SERIES AND PROCESS OF MAKING SAME

Georg Kalischer, Frankfort-on-the-Main, and Ernst Honold, Frankfort-on-the-Main-Fechenheim, Germany, assignors to General Aniline Works, Inc., New York, N. Y., a corporation of Delaware No Drawing. Application July 3, 1930, Serial No. 465,731. In Germany July 17, 1929

8 Claims. (Cl. 260—60)

Our present invention relates to dyestuffs of the anthraquinone series and to a process of making same.

These dyestuffs correspond to the general formula:

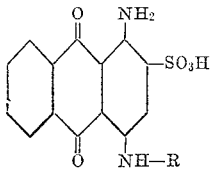

wherein R means a NH2-containing radical of the naphthalene, diphenyl or diphenylsulfide series or a radical of the benzene series containing a substituted amino-group.

They are valuable acid wool dyestuffs dyeing more greenish shades than the 1-amino-4-arylamino-anthraquinone-2-sulfonic acids which are described in U. S. Patent 1,131,516 and dye greenish blue shades.

The process of manufacture in accordance with this invention comprises condensing 1-amino-4-halogen-anthraquinone-2-sulfonic acid with a diamino-aryl compound of the general formula:

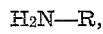

wherein R has the above signification.

This condensation is suitably carried out in an aqueous medium in the presence of an acid-binding agent advantageously with the addition of a copper compound as catalyst. It takes place in such a manner that only one amino-group of the aromatic diamine reacts on the 1-amino-4-halogen-anthraquinone - 2 - sulfonic acid whereas the second amino-group remains unattacked even when an excess of the amino-halogen-anthraquinone-sulfonic acid is used.

In order to further illustrate our invention the following examples are given, the parts being by weight and all temperatures in centigrade degrees, but we wish it however to be understood, that our invention is not limited to the particular products nor reacting conditions mentioned therein:—

Example 1

To a solution of 45 parts of the sodium salt of 1-amino-4-bromo-anthraquinone - 2 - sulfonic acid and 15 parts of m-phenylene-diamine in about 1200 parts of water 20 parts of sodium carbonate and 2 parts of copper sulfate are added and the mixture is maintained with stirring for several hours at 60°. The coloration of the solution is thereby changed to deep greenish blue. The dyestuff formed is salted out or the solution is acidified by the addition of hydrochloric acid. Thereby the dyestuff formed separates in a difficultly soluble form. It may be freed from some impurities by washing out with water. If desired the dyestuff is dissolved again in hot water with the addition of sodium carbonate and salted out as the sodium salt. The coloration of the solution in concentrated sulfuric acid is brownish red. After the addition of paraformaldehyde it becomes green. The dyeing on wool from an acid bath shows a greenish blue shade of an excellent fastness to washing and perspiration.

The new dyestuff corresponds to the formula:

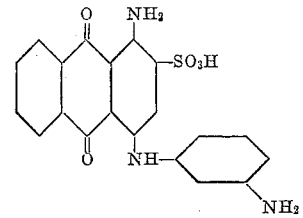

Example 2

45 parts of the sodium salt of 1-amino-4-bromo-anthraquinone-2-sulfonic acid and 30 parts of benzidine are condensed according to Example 1 in an aqueous solution at 80°. The dyestuff is separated by the addition of hydrochloric acid, dissolved again in a strongly diluted solution of sodium carbonate and then salted out as sodium salt. The new dyestuff corresponds to the formula:

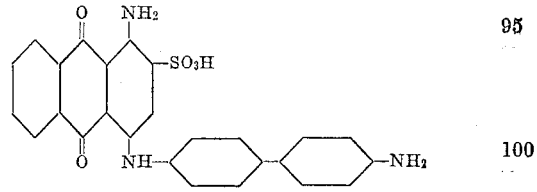

Wool is dyed from an acid bath in a greenish blue shade of excellent fastness even to strong washing. The coloration of the solution in concentrated sulfuric acid is reddish brown and becomes blue after the addition of paraformaldehyde.

By employing in this example instead of benzidine the corresponding amount of m-tolidine a dyestuff is obtained dyeing wool blue shades of excellent fastness properties. The coloration of the solution in concentrated sulfuric acid is olive turning to bluish green after the addition of paraformaldehyde.

*Example 3*

45 parts of the sodium salt of 1-amino-4-bromo-anthraquinone-2-sulfonic acid and 30 parts of 1.5-naphthylenediamine are condensed at 80° according to Example 1 and the mass is worked up as there described. The resulting dyestuff corresponds to the formula:

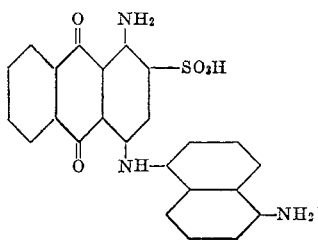

It dissolves in concentrated sulfuric acid with a blue color. The dyeing on wool from an acid bath is a blue shade, showing good fastness properties.

By employing instead of 1.5-naphthylene-diamine the same quantity of 1.8-naphthylene-diamine a dyestuff is obtained dyeing wool greyish blue shades. The coloration of the solution in concentrated sulfuric acid is blue.

*Example 4*

45 parts of the sodium salt of 1-amino-4-bromo-anthraquinone-2-sulfonic acid and 30 parts of p-thioaniline are condensed at 80° according to Example 1 and the mass is worked up as there described. When the dyestuff formation is complete the dyestuff formed is salted out. It corresponds to the formula:

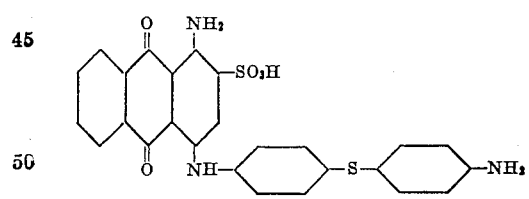

The coloration of its solution in concentrated sulfuric acid is greenish. It dyes wool from an acid bath blue shades of a good fastness.

*Example 5*

45 parts of the sodium salt of 1-amino-4-bromo-anthraquinone-2-sulfonic acid and 20 parts of ethyl-p-phenylene-diamine are condensed in an aqueous solution at 60° in the presence of an acid-binding agent and a copper-compound as catalyst. The resulting dyestuff is salted out as sodium salt. It corresponds to the formula:

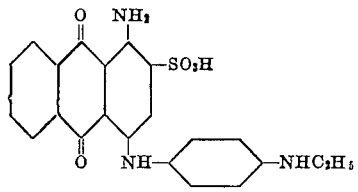

It dissolves in concentrated sulfuric acid with a feeble bluish color turning to green after the addition of paraformaldehyde. The dyeing on wool from an acid bath shows a greenish blue shade.

By replacing the ethyl-p-phenylene-diamine by the corresponding amount of cyclohexyl-p-phenylene-diamine a dyestuff of similar properties is obtained, dying wool from an acid bath greenish blue shades.

*Example 6*

To a solution of 45 parts of the sodium salt of 1-amino-4-bromo-anthraquinone-2-sulfonic acid and 30 parts of the sodium salt of p-phenylene-diamine-thiosulfonic acid of the formula:

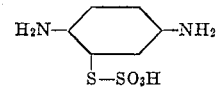

in about 1500 parts of water 20 parts of sodium carbonate and 2 parts of copper sulfate are added and the mixture is stirred for several hours at 60°. When the condensation is finished the dyestuff formed is salted out by the addition of sodium chloride. It dissolves in concentrated sulfuric acid with a feeble reddish brown color, which becomes green by adding paraformaldehyde. The coloration of its solution in water is blue. The dyeing on wool from an acid bath is a greenish blue shade of good fastness properties.

We claim:—

1. Process which comprises condensing in an aqueous medium in the presence of an acid-binding agent and of a copper-compound an 1-amino-4-halogen-anthraquinone-2-sulfonic acid with an aromatic diamino-compound of the general formula:

$$H_2N-R$$

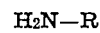

wherein R means a $NH_2$-containing radical of the naphthalene, diphenyl or diphenylsulfide series or a radical of the benzene series containing a primary amino group.

2. As new compounds the acid wool-dyestuffs of the anthraquinone series of the general formula:

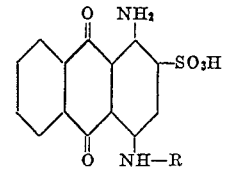

(wherein R means a $NH_2$-containing radical of the naphthalene, diphenyl or diphenylsulfide series or a radical of the benzene series containing an alkylamino or cyclohexylamino-group) which compounds dye wool from an acid bath blue to greenish blue shades.

3. As new compounds the acid wool-dyestuffs of the anthraquinone series of the general formula:

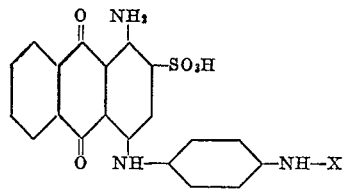

(wherein X means alkyl or cyclohexyl) which compounds dye wool from an acid bath greenish blue shades.

4. As a new compound the acid wool dyestuff of the anthraquinone series of the formula:

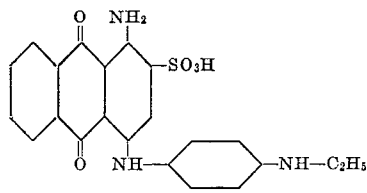

which compound dissolves in concentrated sulfuric acid with a feeble bluish color turning to green on the addition of paraformaldehyde and dyes wool from an acid bath greenish blue shades.

5. Process which comprises condensing in an aqueous medium in the presence of an acid binding agent and of a copper compound a 1-amino-4-halogen-anthraquinone-2-sulfonic acid with benzidine.

6. Process which comprises condensing in an aqueous medium in the presence of an acid binding agent and of a copper compound a 1-amino-4-halogen-anthraquinone-2-sulfonic acid with m-tolidine.

7. As a new compound the acid wool dyestuff of the anthraquinone series of the formula:

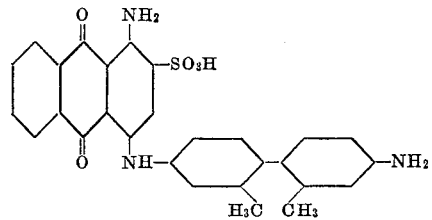

8. As a new compound the acid wool dyestuff of the anthraquinone series of the formula:

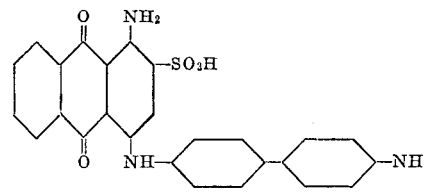

which compound dissolves in concentrated sulfuric acid with a reddish brown color turning to blue on the addition of paraformaldehyde and dyes wool from an acid bath greenish blue shades.

GEORG KALISCHER.
ERNST HONOLD.